May 1, 1962
R. S. ZEBARTH
3,031,823
SYSTEM FOR CONVEYING POULTRY PARTS TO
SEPARATE PACKAGING AREAS
Filed June 16, 1959
2 Sheets-Sheet 1
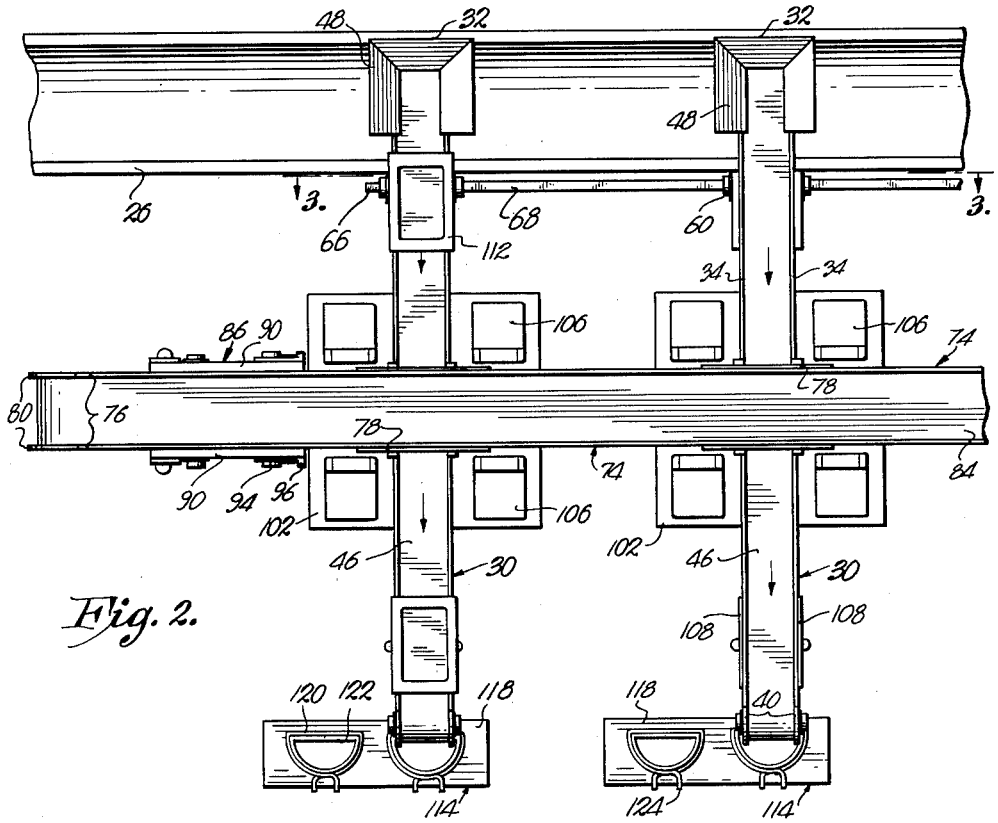
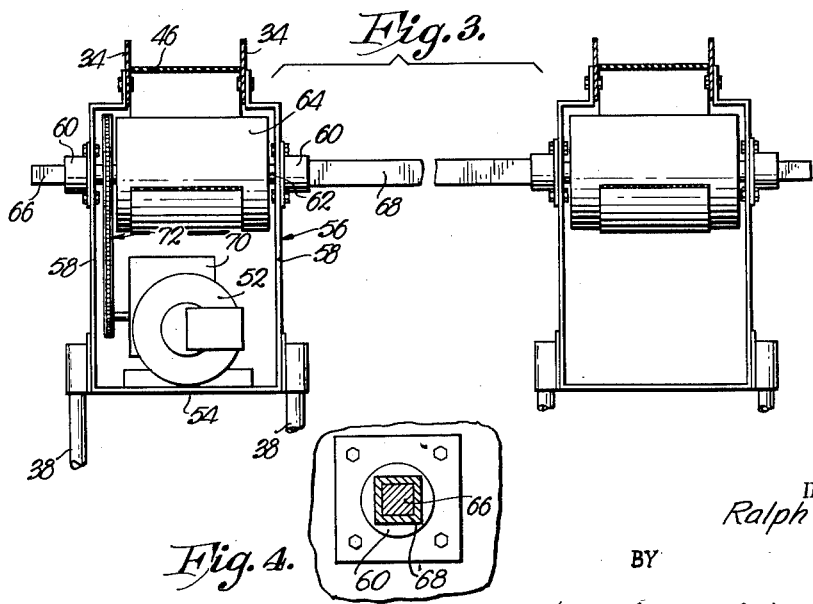
INVENTOR.
Ralph S. Zebarth
BY
Hovey, Schmidt, Johnson & Hovey
ATTORNEYS.

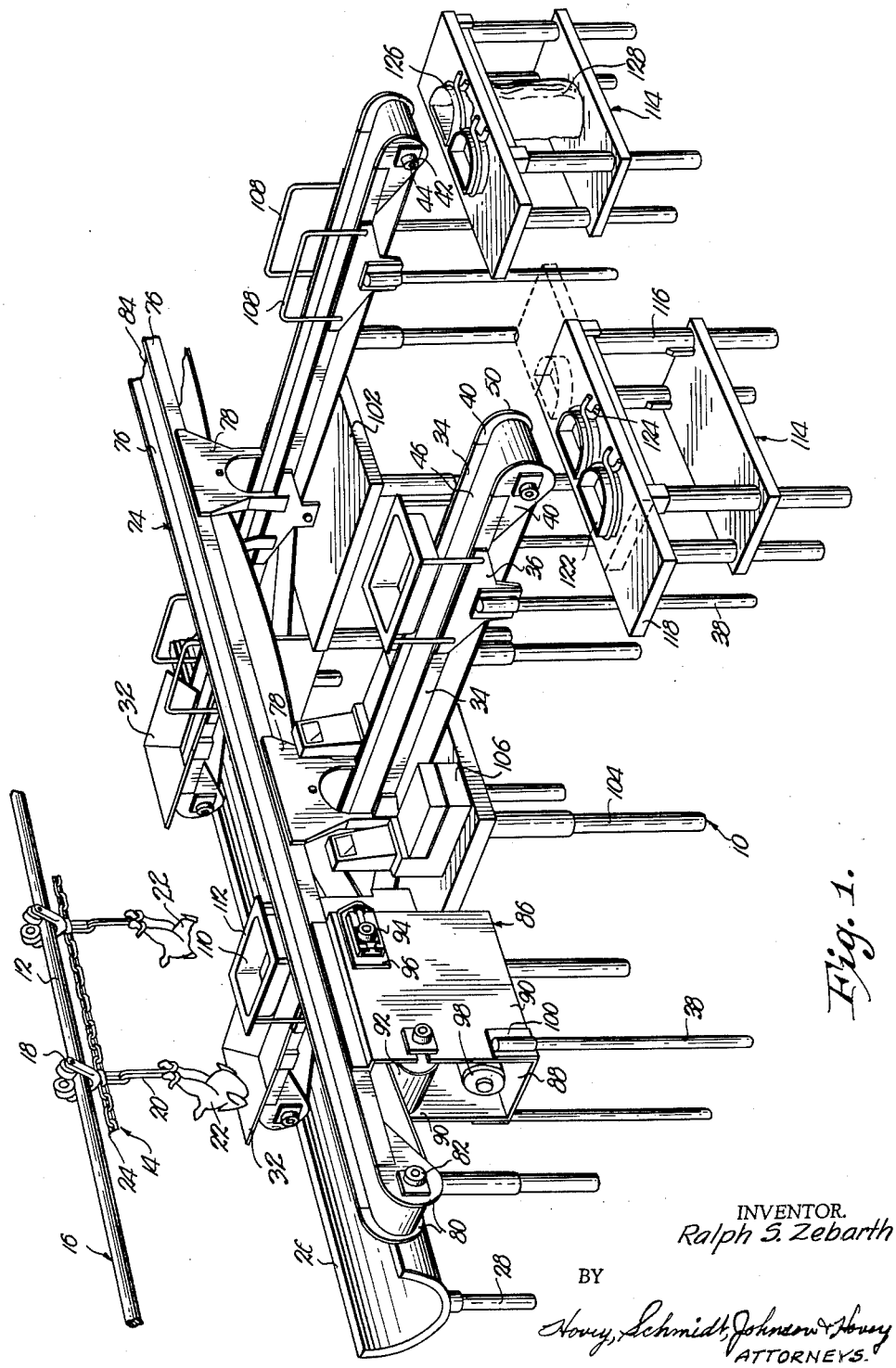

United States Patent Office 3,031,823
Patented May 1, 1962

3,031,823
SYSTEM FOR CONVEYING POULTRY PARTS TO SEPARATE PACKAGING AREAS
Ralph S. Zebarth, Kansas City, Mo., assignor to Gordon Johnson Company, Kansas City, Mo., a corporation of Missouri
Filed June 16, 1959, Ser. No. 820,664
5 Claims. (Cl. 53—391)

This invention relates to poultry handling equipment and has for its primary object to provide apparatus for decreasing the time and labor involved in cutting up and packaging individual parts of the bird in boxes or containers, and also for bulk packing of the individual poultry parts.

Poultry dressing and packaging operations have been speeded up in recent years by utilization of substantially continuous, production line techniques wherein the birds are suspended either by their necks or feet from shackles carried by movable trolleys depending from a serpentine track mounted within the processing plant. The birds, while hung from the overhead track, and continuously moved forward by drive means, are subjected to various cleaning and feather removing operations as well as final dressing for packaging. Many times it is desirable to cut up the bird prior to packaging of the same, and it is further of necessity in many instances, to package predetermined weights of the same kind of poultry parts such as all breasts, thighs, drumsticks or backs.

It is, therefore, a further important object of the invention to provide poultry processing equipment adapted for facilitating packaging of predetermined weights of the same kind of poultry parts and with the processing line operation referred to above being employed with equal advantage in the present system.

More particularly, it is an important aim of the invention to provide poultry processing equipment presenting a series of operating stations along a stretch of the overhead track apparatus which carries the birds while the same are suspended from shackles by their legs, and with conveying means being aligned with such operator stations whereby the operators may sever individual parts from the birds and then place such parts on the conveyor means for transportation of the same to an area remote from the overhead track apparatus. The individual parts, which are maintained in sorted condition, may be directed to a bulk packaging area or additional operators may remove some of the parts from a respective conveyor belt, weigh the same, and package such parts for transfer to another receiving area.

Also an important object of the invention is to provide poultry processing equipment of the character referred to above which may be modified to suit the production capacity of a specific plant by the simple expedient of adding additional conveyor units to the overall system and which preferably are in intersecting relationship to the overhead conveyor apparatus, whereby operators at the stations defined by the zones of intersection of the conveyors with the overhead track apparatus may cut individual parts from the birds while the latter are suspended from the shackles, followed by placement of the parts on the conveyor for transfer to other packaging stations or to bulk part receiving structure.

Another important object of the invention is to provide poultry processing equipment as described which is adapted to be constructed of sanitary materials which may readily be cleaned by merely spraying with water or the like, and with the power driving mechanism of the equipment being shielded in a manner to prevent introduction of moisture into such power equipment.

An important aim is also to provide poultry processing equipment wherein the conveying units disposed in intersecting relationship to the overhead track apparatus, and which are adapted to convey individual parts to respective areas remote from the apparatus, are driven by a single power source which is coupled thereto in a unique manner so that as many conveying units as desired may be driven from such power source without modification of the other units being required.

Also an important object of the invention is to provide poultry processing equipment having trough means underlying the stretch of the overhead conveyor apparatus defined above and also respective ends of the conveying units extending laterally therefrom, whereby the trough serves as a drip pan under the birds passing along the conveyor apparatus and furthermore, permits spraying of the endless belts constituting a part of the laterally extending conveying units, with such spray serving to maintain the belts in a clean condition and with the wash water then draining into the trough for discharge to the sewer.

Other important objects and details of the instant poultry processing equipment will become obvious or be explained in greater detail as the following specification progresses.

In the drawings:

FIGURE 1 is a fragmentary, perspective view of poultry processing equipment embodying the concepts of the present invention;

FIG. 2 is a fragmentary, plan view of the instant equipment;

FIG. 3 is an enlarged, fragmentary, vertical, cross-sectional view taken substantially on the line 3—3 of FIG. 2; and FIG. 4 is a fragmentary, enlarged, vertical, cross-sectional view taken on the line 4—4 of FIG. 3 and looking in the direction of the arrows.

The present poultry processing equipment broadly numerated 10 is adapted to be disposed in predetermined relationship relative to elongated stretch 12 of overhead poultry transporting apparatus 14. As is clear from FIG. 1, stretch 12 of track 16 is adapted to support trolleys 18 which in turn carry shackles 20 adapted to receive the legs of birds 22, whereby the latter are suspended from track 16. Chain 24, operably coupled to trolleys 18, imparts movement to the latter as chain 24 is continuously moved and therefore, birds 22 are moved along stretch 12 of track 16 in parallel relationship thereto.

Equipment 10 includes an elongated, transversely U-shaped trough 26, underlying and substantially coextensive in length with stretch 12 of track 16 and thereby disposed to catch drippings from birds 22 as the same are moved forwardly along stretch 12. A number of legs 28 support trough 26 in a horizontal position and preferably sloping toward a sewer discharge conduit or section (not shown).

A plurality of main conveying units 30 are disposed in proximity to stretch 12 of track 16 and preferably are positioned with one extremity 32 thereof directly overlying trough 26 and underlying stretch 12 of track 16, while the remaining length of each conveying unit 30 extends laterally from stretch 12 in one direction. As shown in FIGS. 2 and 3, main conveying units 30 are in parallel, horizontally spaced relationship and thereby present an operator station at the point where extremities 32 of corresponding units 30 are interposed between stretch 12 and trough 26. Although only two main conveying units 30 have been illustrated in the drawings, it is to be pointed out that as many of such units as desired may be provided but in particular, it is especially contemplated that six units 30 be furnished in order to obtain optimum performance characteristics from utilization of equipment 10.

Each conveying unit 30 includes a pair of parallel, horizontal, elongated side rails 34 having a plurality of support brackets 36 connected to the outer surfaces thereof at each extremity of rails 34 and thereby adapted to receive respective support legs 38 which maintain conveying units 30 in proper horizontal positions, notwithstanding the unevenness of the supporting surface for equipment 10, by virtue of the adjustable nature of legs 38 with respect to corresponding brackets 36.

Plates 40, secured to the outer ends of each of the side rails 34, carry bearing means 42 rotatably supporting shaft 44. Drums (not shown) carried by respective shafts 44 receive endless belt 46 which is preferably constructed of white rubber or other material capable of being easily maintained in a sanitary condition.

Angularly disposed, horizontally U-shaped shield 48 secured to rails 34 at extremity 32 of each unit 30 serves to assure that poultry parts are directed onto belt 46 for conveyance to the opposite extremity 50 of each unit 30 and thereby remote from stretch 12 of track 16.

Means is provided for driving all of the belts 46 continuously at the same speed and preferably comprises an electric motor 52 supported by bottom wall 54 of a housing 56 having a pair of upright side walls 58 suitably secured to respective side rails 34.

Opposed bearings 60, secured to the outer faces of opposed side walls 58, rotatably carry respective ends of a shaft 62 which in turn supports a cylinder 64 between opposed inner surfaces of side walls 58. Transversely rectangular lugs 66, secured to the outer opposed extremities of shaft 62, are adapted to be telescoped within corresponding ends of a tubular tie member 68 extending between each pair of opposed housings 56.

Only one motor 52 is provided for driving all of the belts 46 of conveying units 30 and such motor may be disposed in any of the housings 56 desired, since the cylinders 64 within each housing 56 are interconnected through the medium of transversely rectangular tie member 68 receiving respective lugs 66. The bottom wall 54 of the housing 56 receiving motor 52, as illustrated in FIG. 3, also carries a gear reducer 70 coupled to motor 52 and to the cylinder 64 thereabove by chain and sprocket means broadly numerated 72. The lower stretch of belt 46 of each unit 30 passes under and engages the lower surface of a corresponding cylinder 64 whereby, upon rotation of cylinder 64, belts 46 are driven thereby at a continuous speed.

In order to provide support for extremities 32 of conveying units 30, it is to be preferred that the supporting legs 38 at that end of equipment 10 be connected to respective housings 56, as best shown in FIG. 3.

A secondary conveying unit broadly numerated 74 is provided in overlying relationship to main conveying units 30 and in horizontally spaced relationship to trough 26 and track 16 respectively. As best shown in FIG. 2, secondary conveying unit 74 intersects main conveying units 30 in substantially perpendicular relationship thereto and is located substantially intermediate the ends of units 30.

Secondary conveying unit 74 includes a pair of horizontal side rails 76, in part supported by a number of inverted, U-shaped brackets 78 connected to the outer surfaces of rails 76 and to side rails 34 of main conveying units 30. Plates 80 on opposed ends of side rails 76 carry bearings 82 which in turn rotatably support drum means (not shown) receiving continuous belt 84 thereover which is of the same material as that from which belts 46 are constructed.

A housing 86 underlying secondary conveying unit 74 includes a bottom wall 88, carrying a speed reducer and electric motor unit, as well as a pair of upright, spaced side walls 90 supporting an idler cylinder 92 and a main drive cylinder (not shown) rotatably supported by bearings 94 adjustably secured to respective side walls 90 by adjustable mounting means 96. The lower stretch of belt 84 passes over idler cylinder 92 and under the drive cylinder between opposed side walls 90 to thereby effect movement of belt 84 during operation of motor 98.

A number of legs 38 adjustably secured to brackets 100 on side walls 90 also serve to support the proximal end of secondary conveying unit 74.

A horizontally disposed table 102 is positioned beneath each main conveying unit 30 at the zone of intersection thereof with secondary conveying unit 74, and is maintained in proper spaced relationship from the floor by a number of longitudinally adjustable legs 104. As best shown in FIG. 2, the four corners of each table 102 present rectangular areas for supporting a number of weighing machines 106.

Brackets 36, secured to respective side rails 34 of main conveyors 30, also carry an inverted, U-shaped rod 108, whereby opposed rods serve as means for supporting pans 110 having laterally extending flange portions 112 adapted to rest on respective horizontal segments of rods 108. Pans 110 are thereby removably positioned in overlying relationship to respective main conveying units 30 on opposed sides of secondary conveying unit 74.

Table structure broadly numerated 114 is positioned in underlying relationship to the extremity 50 of each conveying unit 30, each of the structures 114 including an upright frame 116 supporting a horizontally disposed table top 118 movable relative to a respective frame 116 transversely of the longitudinal length of a corresponding conveying unit 30. Each of the table tops 118 has a pair of semicircular openings 120 therein, with upwardly projecting, semicircular flange members 122 being secured to the upper surface of a respective top 118 in circumscribing, complemental relationship to an opening 120. Spring clips 124 removably positioned around each flange member 122 serve to secure the upper marginal portion 126 of a plastic bag or the like 128 in proper position when folded over the upper edge of each flange member 122.

In operation of processing equipment 10, it can be seen that belts 46 of all of the conveying units 30 are driven at a constant, equal speed by motor 52 which operates speed reducer 70, in turn rotating cylinder 64 within housing 56 receiving motor 52 and speed reducer 70, whereby belt 46 of that respective conveying unit is caused to move forwardly in a direction to shift articles placed on the belt, from beneath stretch 12 of track 16 to the opposite extremity 50 of the conveying unit 30.

All of the remaining belts 46 are also driven at the same speed, as indicated above, by virtue of the driving interconnection of cylinder 64 through tubular members 68 telescoped over opposed lugs 66 secured to shafts 62 carrying corresponding cylinders 64.

Belt 84 of conveying unit 74 is also moved during operation of motor 98 and preferably in a direction such that the upper stretch of belt 84 shifts to the right, viewing FIGS. 1 and 2.

It is also assumed that chain 24 is being moved forwardly by suitable drive mechanism, whereby shackles 20 suspended from trolleys 18 are moved forwardly along stretch 12 of track 16 and in direct overlying relationship to trough 26 as well as extremities 32 of conveying units 30 which underlie track 16.

An operator is positioned at each station defined by the extremity 32 of each conveying unit 30 and furthermore, operators are stationed at the four corners of each table 102 and in positions so that they may observe the scale on respective weighing machines 106. It is to be understood that four operators are utilized for each table 102 only during maximum production operations, and the number of such operators can be reduced in accordance with the rate of passage of birds 22 along track 16.

At the first operator station, the worker splits the breast of a bird 22 and cuts off the wings of such bird and places the same on belt 46 of the conveyor unit 30 aligned with the first station, whereby such wings are directed toward table 102.

At the next station, which is aligned with the second conveyor unit 30, one-half of the breast of bird 22 is removed and placed on the aligned conveyor belt 46. The operator at the third station severs the remaining half of the breast from bird 22 and likewise places the same on the aligned belt 46. The fourth operator removes one drumstick and thigh from bird 22 and places the parts on the proximal belt 46, while at the fifth station, the back of bird 22 is removed and placed on the conveyor belt. The sixth and final operator removes the remaining drumstick and thigh from shackle 20 and places the same on the last conveyor belt 46.

As the individual parts are moved toward extremities 50 of belts 46, the operators positioned at the corners of respective tables 102 remove the individual parts from the upper surface of each belt 46 and place such parts on weighing machines 106. When a predetermined weight is reached, the operators package the parts and then place the packages on conveyor belt 84 for movement to a receiving area to the right of equipment 10. By virtue of the provision of a plurality of workers at the zone of juncture of each conveying unit 30 with conveying unit 74, it can be seen that all of the individual parts can be properly packaged, notwithstanding the fact that the operators must seal the packages and place the same on conveyor unit 74, which would normally take more time than a single operator could use and still keep up with the flow of parts from stretch 12 of track 16.

Parts from each of the belts 46 are also placed in pans 110 so that a supply of spare parts is available at all times to meet weighing requirements for a single package and permitting substitution of parts in order to obtain the exact weight desired.

The parts on each belt 46 which the operators around table 102 are not able to remove and weigh, pass into respective bags 128 and thereby provides bulk packaging. When one bag 128 is filled with a predetermined weight of parts, such bag is removed, weighed and bound. The table top 118 is then shifted horizontally to bring the other bag 128 into direct alignment with a corresponding belt 46. This process is repeated, wtih table top 118 being slid back and forth for each bag filled. The utilization of spring clips 124 permits efficient removal of the upper margins 126 of bags 128 from flange members 122 and likewise, placement of a new bag in surrounding relationship to each flange member 122.

Trough 26 disposed beneath stretch 12 of track 16 serves to receive drippings from birds 22 as the same are conveyed along stretch 12 and furthermore, spray means may be provided adjacent extremity 32 of each conveying unit 30 for directing wash water onto each belt 46 to thereby maintain the same in a sanitary condition, with the water thence passing into trough 26 for discharge to the sewer.

Although not constituting a part of the present invention, it is to be recognized that overhead chutes may be provided adjacent the zone of intersection of each conveying unit 30 with conveying unit 74 to deliver boxes and other packaging materials to the operators stationed at the corners of tables 102, to thereby speed up the packaging operation.

Another feature of the present equipment is the fact that the supporting legs therefor are all adjustable to permit vertical movement of the entire assembly to a correct working height.

Having thus described the invention what is claimed as new and desired to be secured by Letters Patent is:

1. Poultry handling equipment arranged to present a system for conveying poultry parts to separate areas and including overhead poultry transporting apparatus having a first operator station along one stretch thereof whereby an operator at said station may cut parts from the poultry while the same is suspended from said apparatus, said equipment comprising the combination with said apparatus of a main conveying unit positioned below said apparatus in substantially intersecting relationship to said stretch thereof and aligned with said first operator station, said main conveying unit including first belt means extending away from said stretch of the apparatus whereby the operator at said first station may place parts cut from the poultry on said first belt means for conveyance to a first area remote from said stretch of the apparatus; a secondary conveying unit disposed in intersecting relationship to said main conveying unit, spaced from said stretch of the apparatus and including second belt means for conveying parts to a second area remote from said first area and the zone of intersection of said main and secondary conveying units, said zone presenting a second operator station whereby an operator at said second station may selectively remove certain of the parts from said first belt means, package the same and place the package on said second belt means for transfer to said second area; and bulk receptacle means at said first area to receive parts conveyed thereto by said first belt means and which were not selected by the operator at said second station.

2. Poultry handling equipment as set forth in claim 1 wherein said bulk receptacle means includes a support, a table shiftably carried by said support and provided with at least a pair of openings therein selectively alignable with the extremity of said first belt means at said first area, and means carried by said table for holding a part-receiving bag within each opening in the table in position to permit the parts to gravitate from said first belt means into the bag within the opening aligned with said first belt means.

3. Poultry handling equipment including overhead poultry transporting apparatus having a first operator station along one stretch thereof whereby the operator at said first station may sever parts from the poultry as the same is suspended from said apparatus, said equipment comprising the combination with said apparatus of a main conveying unit positioned below said apparatus in substantially intersecting relationship to said stretch and aligned with said first station to receive said severed parts for conveying the latter to a first area remote from said stretch; a secondary conveying unit disposed in intersecting relationship to said main conveying unit extending a substantial distance in opposite directions therefrom and spaced from said stretch of the apparatus for conveying parts to a second area remote from said first area and the zone of intersection of said units, said zone defining a series of second operator stations at respective corners of the intersection, whereby an operator at each of said second stations may selectively remove certain of the parts from said main conveying unit, package the same and place the package on the secondary conveying unit for transfer to said second area; and bulk receptacle means at said first area to receive parts conveyed thereto by said main conveying unit and which were not selected by any of the operators at said second stations.

4. The structure as set forth in claim 3, said main conveying unit disposed transversely of said stretch and including first belt means extending from said stretch to said first area, said secondary conveying unit disposed transversely of said main conveying unit and including second belt means extending to said second area, and fixture support means at each corner of the intersection of said units defining said second series of second operator stations proximal to corresponding sides of the main unit, whereby an operator at each of said second stations may remove parts from said main unit and transfer the same to said secondary unit subsequent to weighing and packaging of the parts.

5. The structure as set forth in claim 3, wherein is provided a plurality of main conveying units disposed in parallel relationship, intersecting said secondary conveying unit and spaced apart a distance to present a pair of operator stations therebetween on opposed sides of said secondary conveying means.

References Cited in the file of this patent
UNITED STATES PATENTS

| | | |
|---|---|---|
| 2,625,309 | Cox | Jan. 13, 1953 |
| 2,891,276 | Zebarth | June 23, 1959 |